UNITED STATES PATENT OFFICE.

ROBERT HAERING, OF NEW YORK, N. Y.

IMPROVED PROCESS FOR PURIFYING GUTTA-PERCHA.

Specification forming part of Letters Patent No. 17,214, dated May 5, 1857.

*To all whom it may concern:*

Be it known that I, ROBERT HAERING, of New York, county of New York, and State of New York, have invented or discovered a new and useful Improvement in Purifying Gutta-Percha; and I do hereby declare that the following is a full, clear, and exact description of the same—that is to say—

In the treatment of gutta-percha preparatory to being fitted for the process of vulcanization there has been found a great difficulty hitherto in extracting from it its peculiar etheric oil. This has chiefly been effected by preheating the gutta-percha, either alone or in combination with other matters, and thus driving off the said oil by vaporization. The subsequent working of the gutta-percha is thus rendered more difficult, for the reason that the woody matter and other foreign substances are held far more closely after having been once heated than before. From this difficulty it has heretofore occurred that, although this gum is chemically almost identical with india-rubber and serves identical purposes in many manufactures, still, from the difficulty of preparing it as compared with the caoutchouc, a preference is given to the latter in general manufacturing.

My improvement in purifying the gutta-percha consists in submitting it to the action of a liquor which dissolves out the etheric oil, and also at the same time, by acting upon the woody matter, disengages the sand held with that. To effect this I dissolve one pound of caustic potash (hydrate of potassa) in two gallons of water, and to this add an ether formed from a solution of four ounces chloride of lime in eight ounces of alcohol of .80. Into this mixture I put, say, fifteen pounds of crude gutta-percha, which had previously been finely cut. The whole is then to be heated to the boiling-point and so kept for from eight to ten hours, after which the gutta-percha is removed from the liquor and treated between rollers, under water, in a purifying-machine in the ordinary manner. When taken out the gum will be a pure and solid mass, resembling india-rubber very much, and fully equal to it in fineness and in the readiness with which it may be worked. As thus treated, the gutta-percha may now be perfectly vulcanized in the usual manner with sulphur at a single heating of from four to seven hours, and at a temperature of from 230° to 290° of Fahrenheit.

The liquor may be used for several parcels of gutta-percha by merely adding for each a fresh supply of the ether, as the alkaline quality diminishes but little.

I claim as of my invention or discovery—

The method of purifying gutta-percha by means of the ether and alkali used, substantially as set forth herein.

ROBERT HAERING.

Witnesses:
J. P. PIRSSON,
S. H. MAYNARD.